United States Patent
Mottes et al.

(10) Patent No.: US 9,836,618 B2
(45) Date of Patent: *Dec. 5, 2017

(54) SYSTEM AND METHOD OF AUTHENTICATION OF A FIRST PARTY RESPECTIVE OF A SECOND PARTY AIDED BY A THIRD PARTY

(71) Applicant: VascoDe Technologies Ltd., Tel Aviv (IL)

(72) Inventors: Dorron Mottes, Tel Aviv (IL); Gil Zaidman, Kfar Vitkin (IL); Arnon Yaar, Ramat Hasharon (IL); Ophir Marko, Netanya (IL)

(73) Assignee: VascoDe Technologies Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,130

(22) Filed: Aug. 8, 2016

(65) Prior Publication Data

US 2016/0342809 A1   Nov. 24, 2016

Related U.S. Application Data

(63) Continuation of application No. 14/063,442, filed on Oct. 25, 2013, now Pat. No. 9,413,749.

(Continued)

(51) Int. Cl.
*G06F 21/00* (2013.01)
*G06F 21/62* (2013.01)
(Continued)

(52) U.S. Cl.
CPC ..... *G06F 21/6218* (2013.01); *G06Q 20/4014* (2013.01); *H04L 63/0807* (2013.01);
(Continued)

(58) Field of Classification Search
None
See application file for complete search history.

(56) References Cited

U.S. PATENT DOCUMENTS 6,728,547 B1   4/2004   Frank et al.
6,968,177 B2   11/2005  Miller et al.
(Continued)

OTHER PUBLICATIONS

Authors: Chen; "SMS-Based Web Search for Low-end Mobile Devices"; Publisher ACM 978-1-4503-0181-7/10/09; dated Sep. 24, 2010; pp. 1-10.*

(Continued)

*Primary Examiner* — Hadi Armouche
*Assistant Examiner* — Andrew Steinle
(74) *Attorney, Agent, or Firm* — M&B IP Analysts, LLC

(57) ABSTRACT

A method and system for authenticating a service to access data respective of a user on a low-end mobile device. The method includes sending, from a telephone-to-web adapter, a first authentication token over a first communication path to the low-end mobile device, wherein the telephone-to-web adapter is a separate entity from the low-end mobile device; receiving, at the telephone-to-web adapter, a second authentication token over a second communication path, wherein the second authentication token is received from a host server hosting the service, wherein the first communication path is performed with a first method of communication and the second communication path is performed with a second method of communication; comparing, at the telephone-to-web adapter, the first authentication token to the second authentication token; and allowing access to data upon determining that the first authentication token matches the second authentication token.

17 Claims, 3 Drawing Sheets

Related U.S. Application Data

(60) Provisional application No. 61/867,896, filed on Aug. 20, 2013.

(51) Int. Cl.
    *H04L 29/06*      (2006.01)
    *H04W 12/06*      (2009.01)
    *G06Q 20/40*      (2012.01)

(52) U.S. Cl.
    CPC .............. *H04L 63/10* (2013.01); *H04L 63/18* (2013.01); *H04W 12/06* (2013.01)

(56) References Cited

U.S. PATENT DOCUMENTS

| | | | |
|---|---|---|---|
| 7,245,902 B2 | 7/2007 | Hawkes | |
| 7,463,879 B2 | 12/2008 | Miller et al. | |
| 7,519,354 B2 | 4/2009 | Lee et al. | |
| 7,707,120 B2 | 4/2010 | Dominguez et al. | |
| 7,814,107 B1 * | 10/2010 | Thirumalai | G06F 17/30011 707/749 |
| 8,166,299 B2 | 4/2012 | Kemshall | |
| 8,320,883 B2 | 11/2012 | Watson et al. | |
| 8,413,901 B2 | 4/2013 | Wen | |
| 2005/0086535 A1 | 4/2005 | Ernst et al. | |
| 2005/0283444 A1 * | 12/2005 | Ekberg | G06Q 20/02 705/67 |
| 2006/0230268 A1 * | 10/2006 | Muller | H04L 63/08 713/168 |
| 2007/0142031 A1 | 6/2007 | Lee et al. | |
| 2008/0186921 A1 | 8/2008 | Long et al. | |
| 2009/0215449 A1 | 8/2009 | Avner | |
| 2010/0009659 A1 | 1/2010 | Netanel et al. | |
| 2011/0131638 A1 | 6/2011 | Kan | |
| 2012/0047563 A1 | 2/2012 | Wheeler | |
| 2012/0054102 A1 | 3/2012 | Schwartz et al. | |
| 2012/0089514 A1 * | 4/2012 | Kraemling | G06F 21/43 705/42 |
| 2012/0303534 A1 | 11/2012 | Keller et al. | |
| 2013/0042326 A1 | 2/2013 | Matus | |

OTHER PUBLICATIONS

Chen, et al., "SMS-Based Web Search for Low-end Mobile Devices"; Publisher ACM 978-1-4503-0181-7/10/09; dated Sep. 24, 2010; pp. 1-10.

* cited by examiner

SYSTEM AND METHOD OF AUTHENTICATION OF A FIRST PARTY RESPECTIVE OF A SECOND PARTY AIDED BY A THIRD PARTY

CROSS-REFERENCE TO RELATED APPLICATIONS

This patent application is a continuation of U.S. patent application Ser. No. 14/063,442 filed on Oct. 25, 2013, now allowed, which claims priority from U.S. Provisional Patent Application No. 61/867,896 filed on Aug. 20, 2013. The contents of the above-mentioned applications are hereby incorporated by reference.

TECHNICAL FIELD

The disclosure generally relates to a process of authorization of a first party to access a second party in order to access host services, and more specifically use of a third party for such an authentication process.

BACKGROUND

Majority large portion of mobile devices today are devices having the ability to interface to online services such as email or social networks. Such online services accessed on mobile devices also comprise a registration and authentication process that is performed by establishing a connection between the mobile device, for example a smart phone, and a web server configured to communicate with the mobile device. The mobile device, through a full user interface that includes the likes of a keyboard, pointing devices, touch screen and more, also enable the registration and authentication process with the web server handling the application.

Conversely in current emerging markets, e.g., Brazil, South Africa, or India, many mobile phones are technologically simple devices representing older technologies which are behind the current state of the art of the likes of smart phones. Users of these limited capability mobile phones are often interested in consuming content made available by online services such as email services, access to social media accounts, and so on. However, such users cannot access these services with mobile device which lack many of the minimum requirements needed to support the newer mobile phone technologies. Likewise, such users cannot perform mobile payments, or use their phones as portable card readers which allow mobile devices to become a point of sale.

It would therefore be advantageous to have a solution that would enable access to services by mobile phones having limited capabilities.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for authenticating a service to access data respective of a user on a low-end mobile device. The method comprises: sending, from a telephone-to-web adapter, a first authentication token over a first communication path to the low-end mobile device, wherein the telephone-to-web adapter is a separate entity from the low-end mobile device; receiving, at the telephone-to-web adapter, a second authentication token over a second communication path, wherein the second authentication token is received from a host server hosting the service, wherein the first communication path is performed with a first method of communication and the second communication path is performed with a second method of communication; comparing, at the telephone-to-web adapter, the first authentication token to the second authentication token; and allowing access to data upon determining that the first authentication token matches the second authentication token.

Certain embodiments disclosed herein also include a non-transitory computer readable medium having stored thereon instructions for causing one or more processing units to execute a method, the method comprising: sending, from a telephone-to-web adapter, a first authentication token over a first communication path to the low-end mobile device, wherein the telephone-to-web adapter is a separate entity from the low-end mobile device; receiving, at the telephone-to-web adapter, a second authentication token over a second communication path, wherein the second authentication token is received from a host server hosting the service, wherein the first communication path is performed with a first method of communication and the second communication path is performed with a second method of communication; comparing, at the telephone-to-web adapter, the first authentication token to the second authentication token; and allowing access to data upon determining that the first authentication token matches the second authentication token.

Certain embodiments disclosed herein also include a system for performing authentication of a service to access data on a user device. The system comprises: a processing unit; an input/output (I/O) interface coupled to the processing unit; and a memory, the memory containing instructions that, when executed by the processing unit, configures the system to: send a first authentication token over a first communication path to the low-end mobile device, wherein the telephone-to-web adapter is a separate entity from the low-end mobile device; receive a second authentication token over a second communication path, wherein the second authentication token is received from a host server hosting the service, wherein the first communication path is performed with a first method of communication and the second communication path is performed with a second method of communication; compare the first authentication token to the second authentication token; and allow access to data upon determining that the first authentication token matches the second authentication token.

BRIEF DESCRIPTION OF THE DRAWINGS

The subject matter of the disclosed embodiments is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
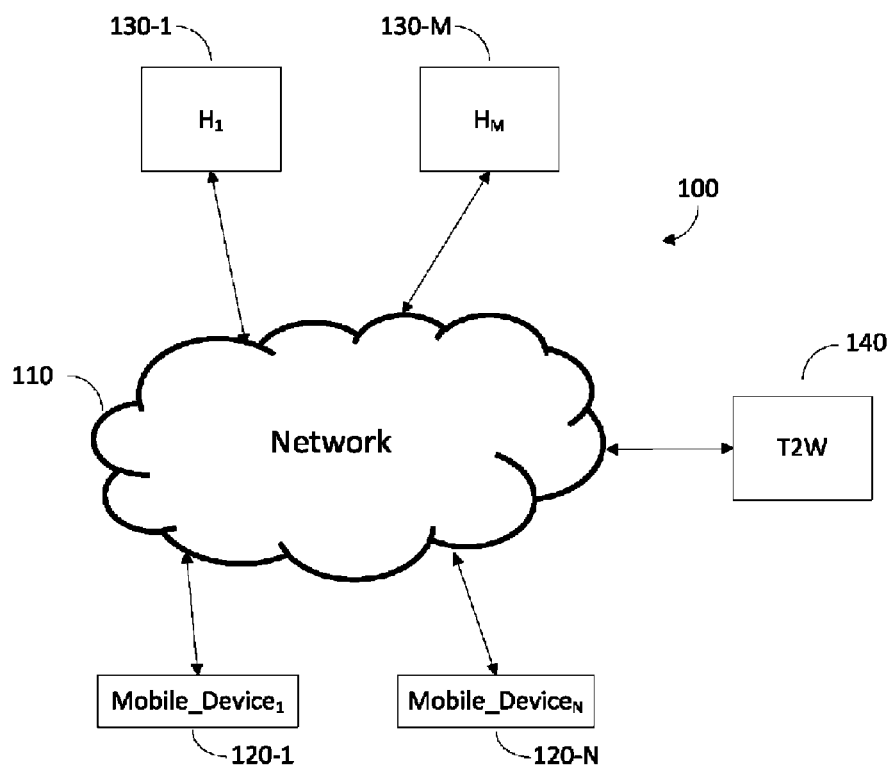
FIG. 1 is a block diagram of an authentication system utilized to describe the disclosed various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

There is a class of mobile phones that predates the likes of smart phones, which is still in wide use in emerging markets. These mobile phones, herein referred to as "feature phones" lack certain or have limited capabilities. Such capabilities include, but are not limited to, the likes of a touch screen, an ability to process hypertext markup language (HTML) files, and more, which makes their operation limited with respect of accessing certain online services. Such online services include the likes of email services, mobile payment services, and social network applications. These deficiencies include, for example, an inability to perform authentication procedures respective of the services or the applications. Likewise, a basic mobile phone, defined herein as a mobile phone which is only capable of voice calling and text messaging, has further limitations with respect of accessing these online services. Basic mobile phones and feature phones may be referred to collectively as low-end mobile phones in this disclosure.

According to certain disclosed embodiments a telephone-to-web (T2W) adapter and method are provided for authentication of a first party with respect of a second party by means of a third party, which thereby allows overcoming at least the deficiencies of the low-end mobile devices as detailed above. According to certain exemplary embodiments, the disclosed teachings provide online services to low-end mobile phones. Such services include at least e-mail services, mobile payments, social network applications, and so on. Moreover, the disclosed teachings may be used to allow the authorized device to grant an application access to a third party host on its behalf.

FIG. 1 depicts an exemplary and non-limiting authentication system 100 utilized to describe the various disclosed embodiments. The authentication system 100 is targeted to be operative with respect of low-end mobile devices, which would otherwise be unable to authenticate themselves with respect of a host providing online services such as those mentioned herein.

A network 110 is configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The network 110 is communicatively connected to one or more web hosts 130 (also referred to as hosts), for example, hosts 130-1 through 130-M, generally referenced as host 130. Each host 130 is configured to provide online services and/or applications, typically for use by mobile phones which are capable of communicating with such services and/or applications.

The network 110 is further communicatively connected to one or more mobile devices 120, for example mobile devices 120-1 through 120-N. According to an exemplary embodiment, the mobile devices 120 are low-end mobile devices and are unable to perform a direct authentication process with the hosts 130 for the purpose of operating with respect of the services and/or applications provided by such hosts 130.

According to the disclosed embodiments, a T2W adapter 140 is further communicatively connected to the network 110. In an embodiment, the T2W adapter 140 is configured to provide a service that adds functionality between an online service on a host 130 and a mobile device 120. Moreover, the T2W adapter 140 is further configured to provide an authentication and registration path that enables the support of the services and/or applications of the hosts 130 on the mobile devices 120, which otherwise would not be possible. There are various configurations to support the deployment, installation or implementation of the T2W adapter 140 in the network 110. According to certain exemplary embodiments, the T2W adapter 140 may be implemented in a Mobile Switching Center (MSC) of a cellular communications network, as an external server communicatively connected with network 110, on a host respective of one of the hosts 130-1, 130-M, or as a service accessible over the Internet or WWW.

It should be noted that a smartphone mobile device could also make use of certain aspects of the teachings made herein as an alternative means for registration and/or authentication, and as further discussed herein.

Figure 2:
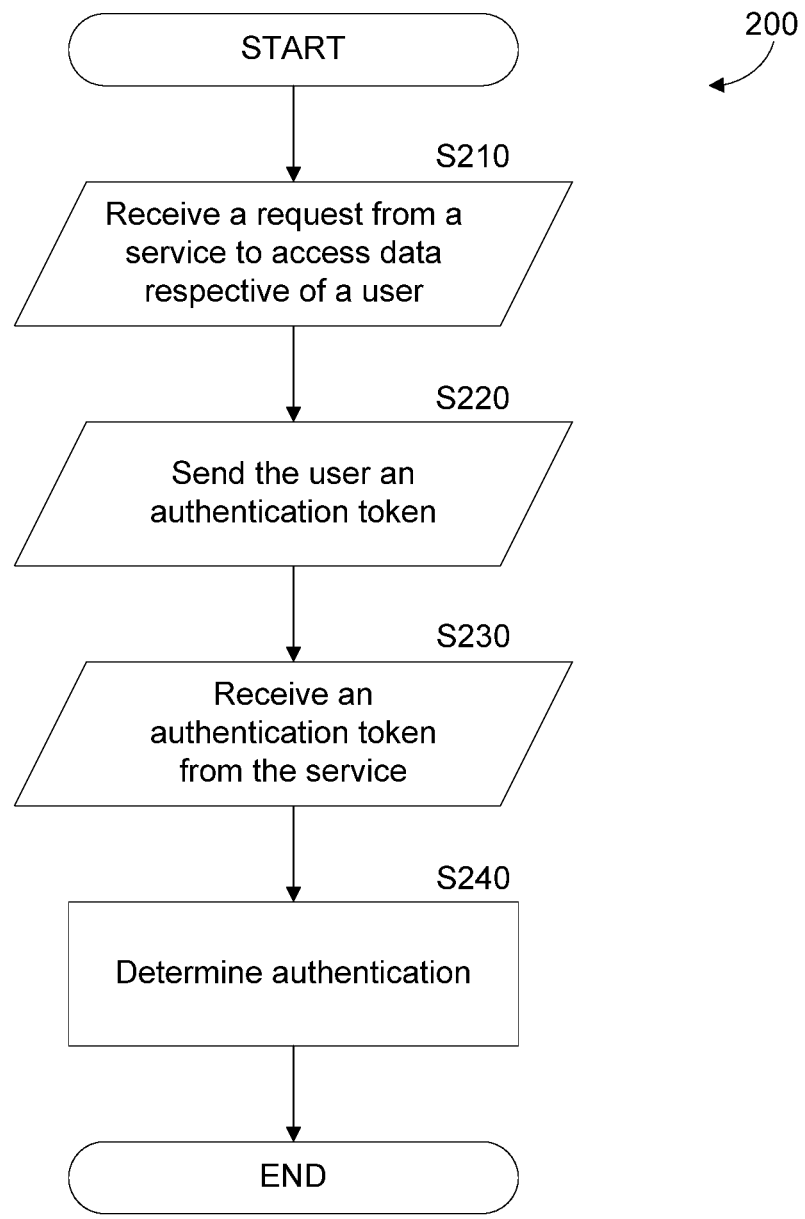
FIG. 2 is a flowchart of a method for authentication of a first party respective of a second party aided by a third party according to an embodiment.

FIG. 2 is a non-limiting and exemplary flowchart 200 of a method for enabling the authentication of mobile devices to access online services provided by hosts according to one embodiment. The method may be performed by the T2W adapter 140. In S210, a request for accessing data respective of a user is received from an online service. The online service may reside on a host, for example, host 130-1. In S220, a first authentication token is sent over a first communication path (not shown in FIG. 1) to a mobile device 120 of a user. The mobile device may be a low-end mobile device. The first authentication token may be sent from the T2W adapter 140 to the mobile device 120.

In S230, a second authentication token is received over a second communication path (not shown in FIG. 1). The second authentication token may be sent by one of the hosts 130-1 to 130-M to the T2W adapter 140. In one embodiment, the second authentication token is sent from the host hosting the requested online service (e.g., host 130-1).

The first and second communication paths can be established using short message service (SMS) or an unstructured supplementary service date (USSD) protocol. The first and second communication paths are different and as such can be established over different communication protocols. As a non-limiting example, a first path may be established using the USSD, while the second path uses the SMS. Likewise, the first and second authentication tokens may be sent as a USSD message or a SMS message.

According to various exemplary embodiments, authentication tokens may be generated, for example, by the T2W adapter 140 or an authentication center (AuC) of an MSC. Token generation by an AuC is performed, for example, respective of an individual authentication key ($K_i$) assigned to a SIM card of the mobile device. The $K_i$ is a shared secret between a mobile device (subscriber) and the AuC. In other non-limiting examples an international mobile subscriber identity (IMSI) number and an encryption key $K_c$ ($K_c$ is generated respective of the $K_i$) may be used. In other embodiments, the T2W adapter 140, may generate authentication tokens respective of random numbers, a cryptographic key, a personal identification number (PIN), a password, an alphanumeric string, data received from an AuC, and the like.

Authentication is determined in S240 by comparing the sent (first) authentication token and the (second) received authentication token. The comparison may be performed, for example, by the T2W adapter 140. The comparison of tokens may include, for example, comparison of two strings or comparison of two security tokens using techniques discussed in the related art. The steps described above may be referred collectively as an authentication session.

In a non-limiting and exemplary embodiment, the method may be utilized to provide an authentication session for use in mobile payments, for example, e-commerce services. An e-commerce service provider, such as a seller of goods, requires performing a transaction to transfer funds from a buyer to the seller. The seller receives from the buyer information respective of the buyer, which includes a buyer identifier, for example, a credit card number, a debit card number, a charge card, a stored-value card, a fleet card, and the like. The seller may connect a card reader to a seller's mobile device for swiping a card in order to read data encoded in a magnetic strip of the card. A request for authenticating data respective of the buyer, in this embodiment, e.g., the buyer identifier, is thereby received. An authentication token is then sent to the buyer's mobile phone over a first communication path, and an authentication token is received from the seller's mobile device over a second communication path. Authentication is determined by comparing the sent authentication token and the received authentication token.

Figure 3:
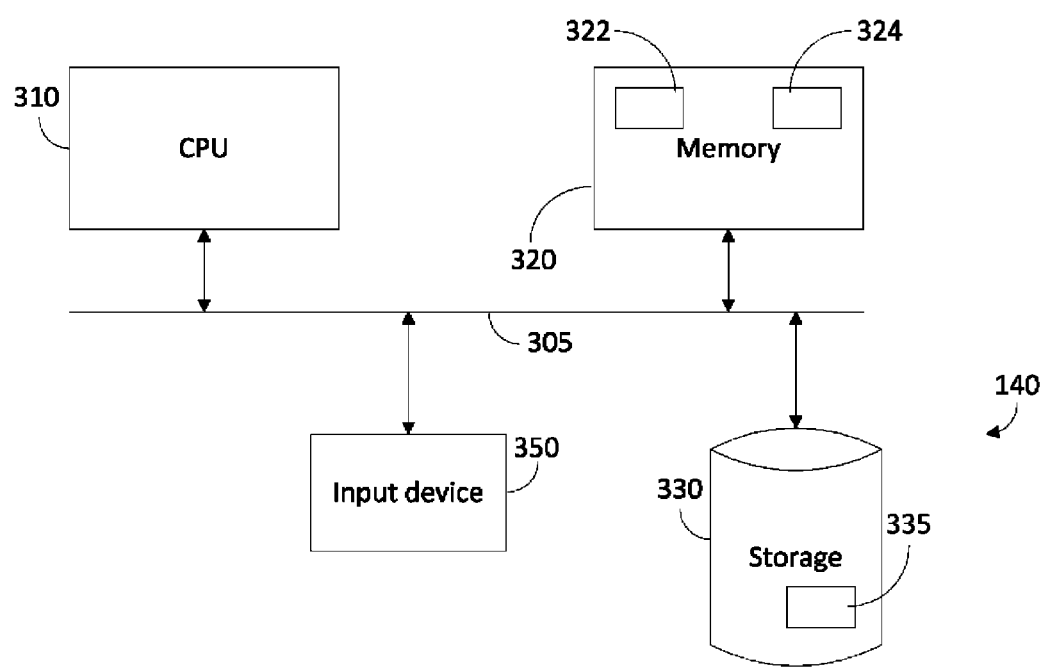
FIG. 3 is a schematic illustration of a telephone-to-web (T2W) adapter implemented according to an embodiment.

FIG. 3 depicts an exemplary and non-limiting schematic illustration of the T2W adapter 140, implemented according to an embodiment. The T2W adapter 140 includes a processing element 310, for example, a central processing unit (CPU) that is coupled via a bus 305 to a memory 320. The memory 320 further comprises a memory portion 322 which contains instructions that when executed by the processing element 310 performs at least the methods described in more detail herein. The memory 320 may be further used as a working scratch pad for the processing element 310, a temporary storage, and others, as the case may be. The memory 320 may comprise volatile memory such as, but not limited to random access memory (RAM), or non-volatile memory (NVM), such as, but not limited to, Flash memory. The memory 320 may further comprise a memory portion 324 containing data respective of at least one authentication session, such as but not limited to an authentication token. The processing element 310 may be coupled to an input device 350, e.g., a mouse and/or a keyboard, and a data storage 330. The data storage 330 may be used for the purpose of holding a copy of the method executed in accordance with the disclosed technique. The data storage 330 may further include a storage portion 335 containing data respective of at least a service.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method of authenticating a service to access data respective of a user on a low-end mobile device, comprising:
   sending, from a telephone-to-web adapter, a first authentication token over a first communication path using a first communications protocol to the low-end mobile device, wherein the telephone-to-web adapter is a separate entity from the low-end mobile device;
   receiving, at the telephone-to-web adapter, a second authentication token over a second communication path using a second communications protocol, wherein the second authentication token is received from a host server hosting the service, wherein the first communication path is established using the first communication protocol and the second communication path is established using the second communication protocol which is different than the first communications protocol;
   comparing, at the telephone-to-web adapter, the first authentication token to the second authentication token; and
   allowing access to data upon determining that the first authentication token matches the second authentication token.

2. The method of claim 1, wherein each of the first communication protocol and the second communication protocol is any one of: short message service (SMS), and unstructured supplementary service data (USSD).

3. The method of claim 2, wherein each of the first authentication token and the second authentication token is sent as any one of: a SMS message, and a USSD message.

4. The method of claim 1, wherein the first authentication token is generated respective of at least one of: a shared secret between the user device and an authentication center (AuC), an international mobile subscriber identity (IMSI), an encryption key generated respective of the shared secret, a random number, a cryptographic key, a personal identification number (PIN), a password, an alphanumeric string, and data received from the AuC.

5. The method of claim 1, wherein the data is buyer information.

6. The method of claim 5, wherein the buyer information includes at least one of: a credit card number, a debit card number, a charge card, a stored-value card, and a fleet card.

7. The method of claim 1, wherein the service is at least one of: an e-commerce service, an email service, and a social media network account.

8. The method of claim 1, further comprising:
generating, by the telephone-to-web adapter, the first authentication token.

9. A non-transitory computer readable medium having stored thereon instructions for causing one or more processing units to execute a method, the method comprising:
sending, from a telephone-to-web adapter, a first authentication token over a first communication path using a first communications protocol to the low-end mobile device, wherein the telephone-to-web adapter is a separate entity from the low-end mobile device;
receiving, at the telephone-to-web adapter, a second authentication token over a second communication path using a second communications protocol, wherein the second authentication token is received from a host server hosting the service, wherein the first communication path is established using the first communication protocol and the second communication path is established using the second communication protocol which is different than the first communications protocol;
comparing, at the telephone-to-web adapter, the first authentication token to the second authentication token; and
allowing access to data upon determining that the first authentication token matches the second authentication token.

10. A system for performing authentication of a service to access data on a user device, the system comprising:
a processing unit;
an input/output (I/O) interface coupled to the processing unit; and
a memory, the memory containing instructions that, when executed by the processing unit, configures the system to:
send a first authentication token over a first communication path using a first communications protocol to the low-end mobile device, wherein the telephone-to-web adapter is a separate entity from the low-end mobile device;
receive a second authentication token over a second communication path using a second communications protocol, wherein the second authentication token is received from a host server hosting the service, wherein the first communication path is established using the first communication protocol and the second communication path is established using the second communication protocol which is different than the first communications protocol;
compare the first authentication token to the second authentication token; and
allow access to data upon determining that the first authentication token matches the second authentication token.

11. The system of claim 10, wherein each of the first communication protocol and the second communication protocol is any one of: short message service (SMS), and unstructured supplementary service data (USSD).

12. The system of claim 11, wherein each of the first authentication token and the second authentication token is sent as any one of: a SMS message, and a USSD message.

13. The system of claim 10, wherein the first authentication token is generated respective of at least one of: a shared secret between the user device and an authentication center (AuC), an international mobile subscriber identity (IMSI), an encryption key generated respective of the shared secret, a random number, a cryptographic key, a personal identification number (PIN), a password, an alphanumeric string, and data received from the AuC.

14. The system of claim 10, wherein the data is buyer information.

15. The system of claim 14, wherein the buyer information includes at least one of: a credit card number, a debit card number, a charge card, a stored-value card, and a fleet card.

16. The system of claim 10, wherein the service is at least one of: an e-commerce service, an email service, and a social media network account.

17. The system of claim 10, wherein the system is further configured to: generate the first authentication token.

* * * * *